July 29, 1969  E. H. GREIBACH  3,458,811
ROOT-MEAN-SQUARE CURRENT METERS
Original Filed July 11, 1962  4 Sheets-Sheet 1

INVENTOR.
E. H. GREIBACH
BY
OSTROLENK, FABER, GERB & SOFFEN
ATTORNEYS

July 29, 1969  E. H. GREIBACH  3,458,811
ROOT-MEAN-SQUARE CURRENT METERS
Original Filed July 11, 1962  4 Sheets-Sheet 2

INVENTOR.
E. H. GREIBACH
BY
OSTROLENK, FABER, GERB & SOFFEN
ATTORNEYS

July 29, 1969    E. H. GREIBACH    3,458,811
ROOT-MEAN-SQUARE CURRENT METERS
Original Filed July 11, 1962    4 Sheets-Sheet 3

INVENTOR.
E. H. GREIBACH
BY
OSTROLENK, FABER, GERB & SOFFEN
ATTORNEYS

FIG. 6.

United States Patent Office 3,458,811
Patented July 29, 1969

3,458,811
ROOT-MEAN-SQUARE CURRENT METERS
Emil H. Greibach, New Rochelle, N.Y., assignor, by mesne assignments, to Solitron Devices, Inc., a corporation of New York
Continuation of application Ser. No. 209,038, July 11, 1962. This application Aug. 11, 1966, Ser. No. 575,216
Int. Cl. G01r 15/10
U.S. Cl. 324—132      22 Claims

ABSTRACT OF THE DISCLOSURE

A root-mean-square current meter utilizes non-linear asymmetric semiconductor junction diodes in two branches of a meter bridge circuit, including a direct current meter coil for indicating, by coil deflection, the root-mean-square value of the A.C. input voltage applied to the input terminals. The meter system presents to the measurement circuit only the limited resistance of the meter coil and the diodes connected between the meter coil and the meter terminals.

---

This invention relates to current meters of the type widely used for measuring the root-mean-square value of alternating current, herein designated A.C. current. This patent application is a continuation of my application Ser. No. 209,038 filed July 11, 1962, now abandoned.

Root-mean-square meters heretofore generally used, are described, for instance, in U.S. Patent No. 1,731,239 issued Sept. 3, 1957 to Hermach. In such R.M.S. meters, the A.C. passes through and heats a thermocouple which develops a corresponding direct current voltage that is supplied to a direct-current meter coil. A scale is used that is calibrated to be proportional to the root-mean-square value of the input voltage applied to the meter terminal. A limitation of thermocouple meters is that their characteristics and calibration stability are poor, and that for accurate measurements such meters are calibrated with an accurately known standard immediately prior to use. Furthermore, each thermocouple of such meter has its own scale distribution, and replacement of a burnt-out thermocouple frequently requires redrawing of the meter scale.

In addition, the most sensitive available thermocouple meters have an input resistance of about 1500 ohms and draw 1.5 milliamperes at full scale deflection, of the order of 3.375 milliwatts power. In many applications, the current source to be measured cannot supply such meter power demand.

Dynameter type instruments with a stationary coil and a movable coil for R.M.S. measurements have been used. But their application is limited by the high power which they draw from the source of measured current. They are also limited to the measurement of low-frequency currents.

In my U.S. Patent No. 1,990,782 issued Feb. 12, 1935 I described an R.M.S. current meter with one meter terminal connected to the center of a direct-current rotary meter coil, the ends of which were connected to the other meter terminal through two bridge arms each including a thermionic vacuum tube rectifier, the hot cathode of which could be adjusted to produce in the meter coil a current proportional to the root-mean-square of the voltage applied to the two meter terminals. However, this meter required special adjusting circuits as well as a series of critical adjustments before each use. Heretofore, thermocouple meters remained the basic instrument for measuring the root-mean-square current proportional to an input voltage applied to the meter terminals.

Among the objects of the present invention are the provision of high-accuracy R.M.S. current meters which retain stability and accuracy over a long period of time, and which avoid the other limitations of the known thermocouple meters type; also R.M.S. current meters which accurately measure the R.M.S. value of alternating current, independently of the wave shape of the current.

The present invention is based upon the discovery that certain non-linear asymmetric semiconductor junction diodes of special characteristics may be combined with two branches of a meter bridge circuit including a direct current meter coil for indicating (by the coil deflection) the root-mean-square value of the A.C. input voltage applied to the terminals of such meter circuit. Such meter system of the invention presents to the measurement circuit only the limited resistance of the meter coil and of the asymmetric semiconductor junction diodes connected between the meter coil and the meter terminals.

The foregoing and other objects of the present invention will be best understood from the following description of exemplary embodiments thereof, reference being made to the accompanying drawings, wherein:

FIG. 1–A is a circuit diagram of a transducer bridge circuit of the invention for delivering from its output terminals current proportional to the square of an A.C. input voltage applied to its input terminals;

FIG. 3–A is a supplementary curve diagram explanatory of some features of the circuit systems of the invention underlying the meter of FIG. 1 and the transducer of FIG. 1–A;

Figure 1:
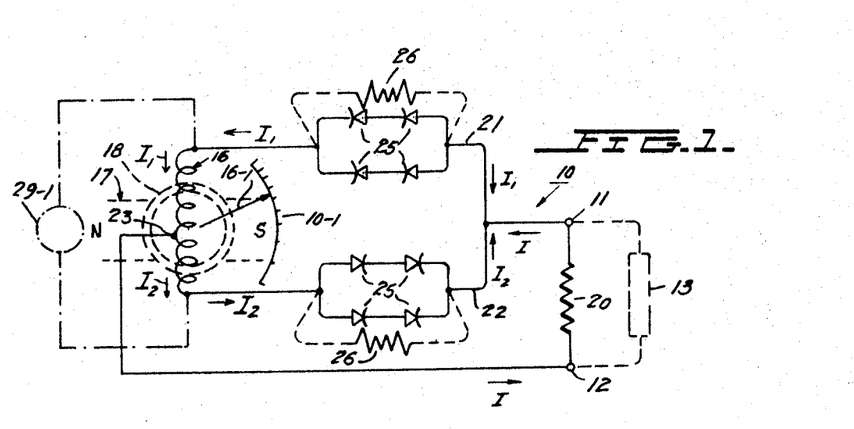
FIG. 1 is a diagrammatic view of one form of meter system exemplifying the present invention.
Figure 1A:
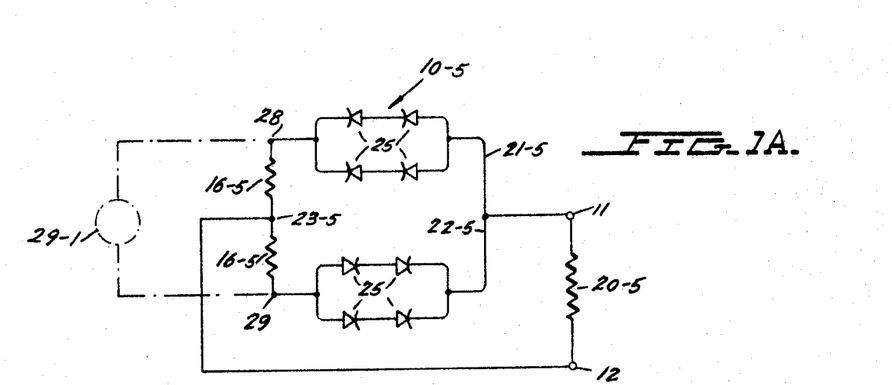
Figure 2:
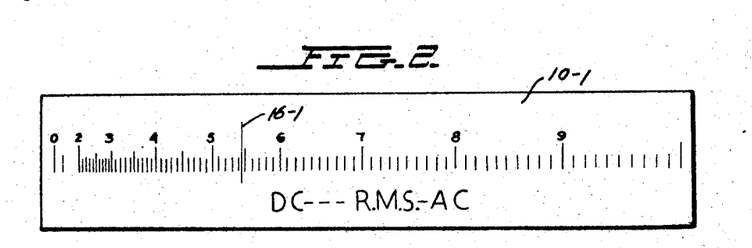
FIG. 2 is a front view of the scale of the meter indicated in FIG. 1.

FIG. 1 shows diagrammatically one form of meter system of the invention operating with a direct-current rotary meter coil 16 wherein the coil deflection indicates through its pointer 16–1 on scale 10–1. The D.C. current through the meter coil will be shown to be proportional to the square of the applied D.C. input voltage at terminals 11, 12. Meter circuit system 10 has two terminals 11, 12 to which the voltage input from an external circuit 13 (shown in dash-lines) to be measured is applied. The meter system 10 has a conventional D.C. rotary coil meter movement comprising the rotary coil 16 attached to pointer 16–1. The meter coil 16 is arranged to rotate in predetermined unidirectional magnetic-field air gaps of a substantially closed magnetic core structure indicated by dashed-line 17, having two opposite poles N and S, and an intermediate core element 18. The meter system of the invention shown in FIG. 1 has two branch circuits 21, 22 connecting one input terminal, namely terminal 11 to the opposite ends of meter coil 16. The other input terminal 12 is connected to the central turn 23 of coil 16 which subdivides the coil into two alike coil sections to complete a bridge circuit.

The present invention is based on the discovery that under certain conditions forming part of the invention hereafter explained (with input voltage applied to the two input terminals (11, 12)), the inclusion in each branch circuit (21, 22) of at least two solid-state asymmetric nonlinear semiconductor junction diodes having certain current-voltage characteristics hereafter described, it is possible to produce in the two branch circuits (21, 22) and the associated direct-current meter coil (16) two predominantly opposite currents of certain critical characteristics, the algebraic sum (difference herein) of which constitutes the effective coil current whose instantaneous value is proportional to the square of the instantaneous value of the A.C. input voltage applied to the terminals of the meter-system. These features of the meter system of the invention will now be explained by reference to the curves of FIG. 3.

The current (I) passing through one of the asymmetric semiconductor junction diodes as a function of the input voltage (E) applied to its opposite electrodes can be represented by a MacLaurin series expansion equation $$I = f(o) \pm E \cdot f'(o) + \frac{E^2}{2} \cdot f''(o) \pm \frac{E^3}{6} \cdot f'''(o) + \frac{E^4}{24} \cdot f^{iv}(o) \pm \quad (1)$$

For a semiconductor junction diode the first equation term $f(o)$ is the current at zero voltage and is zero. The odd power term of this equation have (+) and (−) signs since the polarity of the current follows the polarity of the voltage, reversing in successive half-cycles of the applied A.C. voltage.

The total current (I) to be measured which flows into the meter circuit 10 from the input terminals 11 and 12 is determined by the input voltage (E) applied to these terminals and the resistance R of the meter circuit system. As seen in FIG. 1, this total meter current (I) consists of the sum of the two branch currents $I_1$ and $I_2$, each of which is defined by the series expansion of Equation 1. In the sum of the two currents $I_1+I_2$, it can be demonstrated that the even power terms of this expansion series cancel, and the resistance R of the meter circuit is $$R = E/I_1 + I_2 = E/2((f'(o)E + 1/6f'''(o)E^3 + 1/120f''''(o)E^5)) \quad (2)$$

In the resistance Equation 2 the higher than third power terms of the denominator are negligible and only the third power term, although very small, will have some influence and produce deviations of the meter circuit resistance which may be of the order of 1% to 2% of its normal constant D.C. resistance. For accurate measurement it is essential to minimize the effect of these resistance deviations.

In accordance with the invention, the undesirable effect of these small deviations of the resistance of the meter circuit on the operation of the meter are minimized by connecting across the meter input terminals 11 and 12 a shunting resistance 20 which for the highest sensitivity setting is chosen to be approximately equal to the constant D.C. resistance of the meter circuit, with shunting resistance 20 being of lower resistance for the lower sensitivity settings of the meter.

In a meter circuit of the invention having its resistance so stabilized, the instantaneous coil torque is proportional to the instantaneous coil current. This coil torque is equal to the torque produced by the difference of the two branch currents $I_1$ and $I_2$ since they enter the coil 16 from opposite sides thereof. In this current difference it can be demonstrated that the odd power terms of the current Equation 1 will cancel so that coil torque T which determines the current-measuring coil deflection is defined by $$T = K(I_1 - I_2) = K(aE^2 + bE^4 + cE^6) \quad (3)$$

This torque equation contains only the even power terms of series expansion Equation 1. In this coil torque equation, K is a constant fixed by the coil characteristics and $a, b, c, \ldots$ are constants fixed by the characteristics of the asymmetric conductor junction diodes.

The present invention is based on the discovery that—as distinguished from the generally available semiconductor rectifier junction diodes—certain nonlinear asymmetric semiconductor junction diodes, which conduct an appreciable reverse current and have a mathematically continuous $I-E$ or current-voltage function curve which goes through zero, have current-voltage characteristics which cause the higher order terms $b, c$, etc. in the foregoing torque equation to converge rapidly to zero and become negligible. As a result the coil torque Equation 2 can be represented by the equation $$T = K_1 E^2 \quad (4)$$

wherein $K_1$ is a constant. Meters constructed in accordance therewith bear out the formulae hereinabove.

The ideal nonlinear asymmetric semiconductor junction diodes of the characteristics required for producing a coil torque defined by Equation 4 in root-mean-square meters of the invention should have the following operating characteristics: The $I-E$ curve—on conventional crossing coordinates representing the junction current I as a function of the applied junction voltage E—should pass through the zero of the current-voltage coordinate system and should be continuous over a voltage range including substantial portions both above and below zero voltage; and the derivative $dI/dE$ of this continuous current-voltage function curve should be continuous over the same substantial voltage range. Such a semiconductor diode is illustrated in Patent No. 3,086,166 issued April 1963, and is identified as IN305/CK739.

In the special asymmetric semiconductor junction diodes having such current-voltage characteristics the current near zero voltage is almost the same in both directions and therefore there is practically no rectification near zero voltage or the origin of the current-voltage coordinate system. However, over the desired voltage range the forward current is greater than the reverse current, but these two currents are of the same order of magnitude. Good results are obtained with such special characteristic semiconductor junction diodes wherein the ratio of the reverse current to the forward current varies from $\frac{1}{1.5}$ to $\frac{1}{4}$ and higher to values of $\frac{1}{10}$.

In generally used conventional semiconductor rectifier junction diodes, the current-voltage curve on a crossing coordinate system does not have a continuously variable derivative over the voltage range including and extending both above and below zero voltage, so that a MacLaurin series expression cannot represent its $I-E$ characteristic. Furthermore, in conventional semiconductor junction diodes, the forward current is of a substantially higher order of magnitude than the minute reverse current so that the higher order terms, even if a MacLaurin series expression were valid, would not be negligible as required in the present invention.

Figure 3:
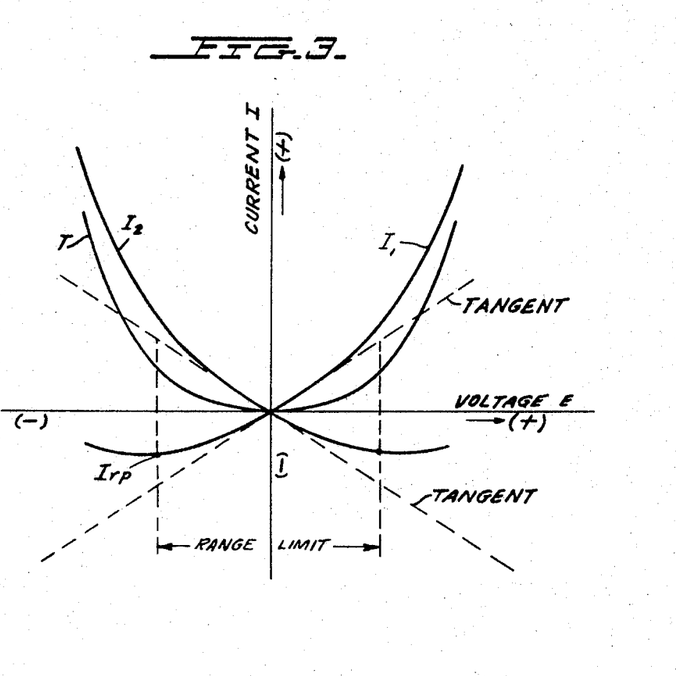
FIG. 3 are curve diagrams explanatory of the principles underlying the meter and transducer circuits of the invention such as shown in FIGS. 1 and 1–A.

In FIG. 3 curves $I_1$ and $I_2$ represent the above described current-voltage function curves of the particular type of non-linear semiconductor junction diodes 25 suitable for use in the meter system of the invention, such as that shown in FIG. 1. Since the semiconductor junction diodes 25 are connected in opposite polarity in the two branch circuits 21, 22 of FIG. 1, current will pass through them and the two meter coil sections in reverse directions. Curve $I_1$ represents the current through circuit 21 and the upper coil section and curve $I_2$ the current though circuit 22 and the lower coil section. These two branch currents $I_1$ and $I_2$ enter into opposite ends of the meter coil 16 and produce net torque deflection represented by the parabola-shaped curve T of FIG. 3. This difference current ($I_1-I_2$) represented by curve T produces the coil torque on an instantaneous basis in real time. However, due to the inertia of the coil system 16 only the net average torque deflects the meter coil 16 and its pointer 16–1 that indicates on scale 10–1 a result that corresponds to the root-mean-square of the voltage applied to input terminals 11, 12 and to the A.C. current flowing through the meter circuit.

Although there is likelihood of development of improved special nonlinear asymmetric semiconductor junction diodes of the type described above in connection with curves $I_1$ and $I_2$ of FIG. 3, in those now available the reverse current, after first increasing for increasing reverse voltage, starts decreasing for further increase of reverse voltage beyond the reverse current peak $I_{rp}$ at which the tangent is parallel to the E axis. This reverse current peak $I_{rp}$ constitutes the range limit over which such meter system of the invention can make high accuracy R.M.S. measurements because for higher input voltages the larger currents would not produce coil deflections which are accurately proportional to the R.M.S. value of such applied higher input voltages. Those skilled in the development and manufacture of semiconductor junction diodes are aware of the fact that by increasing the amount of the impurity introduced into the semiconductor element, the conventionally generally used diodes may be given characteristics of the form shown in FIG. 3.

In accordance with the invention, an R.M.S. meter circuit system includes at least two such asymmetric semiconductor junction diodes 25 connected in series in each branch circuit 21 and 22, thereby doubling the voltage range over which the meter of the invention will measure the R.M.S. value of the applied higher input voltage and of the A.C. current through the meter circuit. By serially connecting in each such meter circuit branch 21, 22 three or more such special semiconductor junction diodes, the voltage and current range of accurate R.M.S. measurement may be further increased.

Furthermore, the R.M.S. meters of the present invention will measure the R.M.S. value of A.C. voltage or current independently of its wave shape. The ratio of the peak value to the R.M.S. value of alternating current is known as crest factor and is the square root of 2 or $\sqrt{2}$ for a sinusoidal current wave. For less peaked A.C. current waves, the crest factor is smaller and for more peaked A.C. currents the crest factor is larger than $\sqrt{2}$. The meters of the invention will give accurate R.M.S. measurements independently of the crest factor of the A.C. over the current wave range wherein the peak current does not exceed the range for which the MacLaurin power expansion is valid. This determines the top value of the crest factor for which the meter system of the invention will give true R.M.S. measurements of A.C. currents. With the special semiconductor junction diodes described this top value limit of the crest value is determined by the voltage drop at the reverse current peak $I_{rp}$ of such diodes.

In accordance with the invention this top value limit of the crest factor for making R.M.S. measurement of A.C. currents is extended by multiple series combinations of such special nonlinear semiconductor junction diodes, and is also extended by shunting them with one or more symmetrical nonlinear resistances, known as varistors. This is possible since the inherent capacity of each such special asymmetrical semiconductor junction diode is extremely small and its resistance characteristics remains constant from D.C. up to very high A.C. frequencies of the order of $10^8$ c.p.s. As an example, a meter of the invention designed to operate with 100 milliampere full scale deflection will measure accurately within ½ of 1% or better for frequencies up to $1 \times 10^6$ c.p.s.

The increase in the number of the foregoing special semiconductor junction diodes in each branch arm of the meter system is of great value in further minimizing the coefficients $b$, $c$, etc. in torque Equation 4 and the effect that their higher power terms might have. Furthermore, for proper operation of the R.M.S. meter system of the invention it is important that each branch arm (21, 22) of the meter bridge circuit system shall have substantially identical current-voltage characteristics in order that for a given applied A.C. input voltage the currents in each complementary pair of branch circuits (21, 22) passing in opposite directions through the meter coil shall be substantially identical. The increase of the number of the special nonlinear semiconductor junction diodes in each such complementary pair of meter branch circuits facilitates their equalization and thereby assure that for practical purposes the coil torque of the meter coil 16 closely conforms to torque Equation 4. By including in each of two complementary branch circuits, in addition to at least one pair of such serially connected special semiconductor junction diodes, one or additional sets of such serially connected in shunt or parallel to each other, it is possible to make the desired R.M.S. measurement of correspondingly larger currents.

The current measuring range of the meters of the invention described above which is limited by the reverse current peak $I_{rp}$ of the current-voltage function curve of the special semiconductor junction diode may also be extended with only one semiconductor junction diode in each branch circuit, by shunting such semiconductor junction with a nonlinear resistance such as the symmetric nonlinear resistances described in McEachron U.S. Patent No. 1,822,742 the current through which is defined by $$I = N^n \tag{5}$$

Figure 3A:
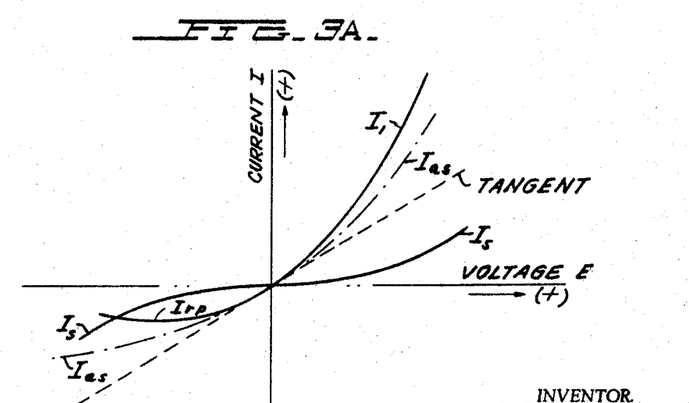

This feature of the invention will be explained by reference to the curves in FIG. 3–A wherein curve $I_1$ represents the current voltage function of the special asymmetric nonlinear semiconductor junction diode identical with curve $I_1$ of FIG. 3. To overcome the meter range limitation imposed by the reverse current peak $I_{rp}$ of its current-voltage characteristics $I_1$, there is connected in parallel to each semiconductor junction diode 25 in each bridge arm 21, 22, or to the several semiconductor junction diodes 25, thereof, a symmetric nonlinear resistance 26, as in the example of FIG. 1. In FIG. 3–A curve $I_s$ represents the current-voltage function of such parallel connected symmetric resistance 26 which rises exponentially with increasing positive and negative applied voltage. Dash-line curve $I_{as}$ is the modified current-voltage characteristic of the special asymmetric nonlinear semiconductor junction diode 25 combined with a symmetric nonlinear resistance 26, and shows that for such combination reverse current continues to increase beyond the reverse-current peak of the special semiconductor junction diode characteristic curve $I_1$. The limitations on the range R.M.S. current measurements with the R.M.S. meters of the invention imposed by the reverse current peak of the current-voltage function curve $I_1$ of the special semiconductor junction diodes can thus be eliminated.

Figure 4:
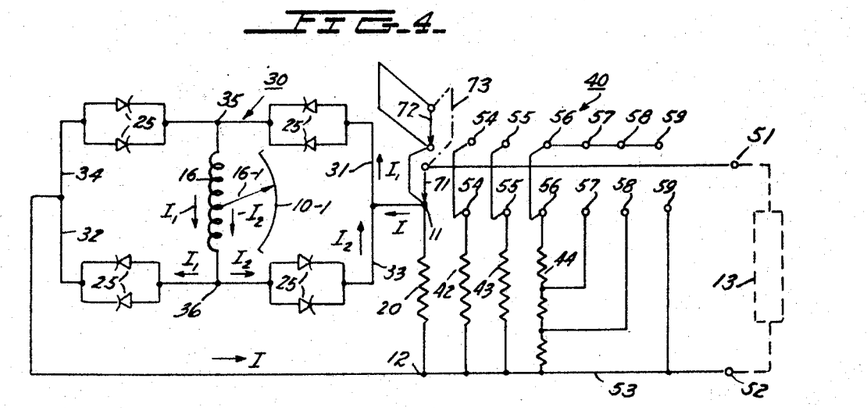
FIGS. 4 and 4–A are respectively two circuit diagrams analogous to those of FIGS. 1 and 1–A, but of modified forms of meter and transducing circuits exemplifying the invention.

The R.M.S. meters of the invention described above in connection with FIGS. 1, 2, 3 and hereafter in connection with FIG. 4, constitute electric transducer systems which transduce an A.C. input voltage applied to the input terminals of the system into a voltage developed across the impedance of the meter coil winding and into an output current which is passed through the meter coil impedance or any other load impedance connected to the coil terminals across which the circuit system of the invention develops a voltage which is proportional to the square of the applied A.C. input voltage.

The principles of the invention underlying the R.M.S. meter described above in connection with FIGS. 1–3 are of value in other applications, such as static transducers for transducing an electric input signal into an output signal which at all times is proportional to the square of the input signal, the input signal being either a voltage or a current signal.

FIG. 1-A shows one form of such static signal squaring transducer 10-5 which is analogous to the meter circuit 10 of FIG. 1. Transducer 10-5 has a pair of input terminals 11 and 12 through which the signal to be squared is supplied. Input terminal 11 is connected through two complementary bridge circuit arms 21-5, 22-5 across or to the ends of a bridge impedance or resistance consisting of two equal resistances 16-5 the junction 23-5 of which is connected to the other input terminal 12. The two bridge arms 21-5, 22-5 include oppositely poled sets of the special type of semiconductor junction diodes 25 for passing through the resistances 16-5 currents $I_1$ and $I_2$, such as passed through meter coil 16 and represented by curves $I_1$ and $I_2$, as described above in connection with FIGS. 1–3. A shunt resistance 20-5 (corresponding in operation to shunt resistance 20 of FIG. 1) is connected across the input circuit or input terminals 11, 12. In a manner analogous to the meter system of FIG. 1, the resulting difference of the two currents $I_1$ and $I_2$ will be a resultant current T flowing through the bridge resistances 16-5 which is proportional to the square of the voltage impressed on input terminals 11 and 12. To the ends of the bridge resistances 16-5 is connected a pair of output terminals 28, 29 across which the bridge resistances 16-5 develop an output voltage which is the square of the input voltage impressed at the input-terminal pairs 11, 12. To an output circuit connected to output terminal pair 28, 29 as indicated in FIG. 1-A, the squared voltage developed across bridge resistances supplies an output current proportional to the square of the input voltage or input current. Any properly proportioned impedance may be used as the main bridge impedances 16-5, of FIG. 1-A.

The principles of the invention as described above in connection with the meter system described in connection with FIGS. 1–3 and the transducer system of FIG. 1-A will suggest other modified meter and transducer systems based thereon.

FIG. 4 shows one form of such modified R.M.S. meter system 30 exemplifying the invention. Meter system 30 has a conventional direct-current rotary coil meter movement 16 which may be identical with that of FIG. 1. The rotary meter coil 16 carries a pointer 16-1 for effectively indicating by the coil deflection on a scale 10-1 the R.M.S. of the input A.C. voltage applied to the meter terminals 51, 52 from an external source 13 (as in FIG. 1). The one terminal 51 is connected through two branch circuits 31 and 33 to the opposite ends of terminal ends 35, 36 respectively of meter coil 16. The other meter terminal 52 is connected through analogous two branch circuits 32 and 34 to the same meter coil terminals 36 and 35 respectively. In the meter system 30 each of the pair of branch circuits 31 and 32 includes a set or module of the special nonlinear asymmetric semiconductor junction diode sets connected therein with opposite polarity in each branch so as to cause a given input voltage applied to meter terminals 51, 52 to pass predominantly opposite currents (corresponding two coil currents $I_1$ and $I_2$ of FIG. 3) through all turns of meter coil 16 as indicated by current arrow $I_1$ and $I_2$ applied to the coil 16 (in a manner analogous to the circuit of FIG. 1).

The algebraic sum of the two predominantly opposite coil currents $I_1$ and $I_2$ passing through the turns of meter coil 16 give a resulting coil which is proportional to the square of the input voltage applied to meter terminals 51, 52 of meter system 15 as represented by parabolic current-voltage curve T in FIG. 3. This resulting coil current T produces corresponding coil deflection and coil torque which deflects the meter coil 16 for indicating with its pointer 16-1 on scale 10-1 the R.M.S. of the instantaneous input signal current. A shunt resistance 20 (analogous to that of FIG. 1) is connected in shunt to the meter input terminals 11, 12 for the same purpose.

As in the case of the meter system of FIG. 1, in the meter system 15 of FIG. 4, the two meter terminals 11, 12 are equipotential points of the meter circuit. As a result a shunt resistance, such as shunt resistance 20 connected across the meter terminals 11, 12 of FIG. 4 (or FIG. 1), does not damp the motion of the meter coil 16 in the way that such a shunt resistance 20 would do if connected directly across the coil terminals 35, 36. Accordingly, the meter system of the invention may be operated with a series of additional different lower sensitivity settings by selectively connecting in sequence additional different shunting resistances 42, 43, 44 across the meter terminals 11, 12. Such lower-sensitivity meter shunt arrangement has the advantage that the millivolt drop of the input voltage impressed across each different measured current at the different sensitivities remains constant, and such voltage drop does not increase as is the case when using conventional universal meter shunts. This method of operating the meter system of the invention with different lower sensitivities such as described in connection with FIG. 4, and also applicable to the meter of FIG. 1, can be used only as long as the contact resistances of the switch contacts—by which successive lower shunting resistances 42, 43, 44 are connected to the meter input terminals 11, 12 for lowering the desired sensitivity—is negligible in comparison to the connected lower sensitivity shunt resistances 42, 43, 44. Accordingly, for the measuring of heavy current which requires a lower shunt resistance than for example shunt resistance 44, universal shunt connections are best provided for such still lower sensitivity settings.

FIG. 4 shows one form of a meter shunt system 40 that may be combined with a meter system of the invention for performing current measurements with a series of lower sensitivity settings. The meter shunt system of FIG. 4 has a pair of main external terminals 51, 52 to which the external circuit 13 is shown connected. In order to make measurements of currents with lower sensitivities (in addition to the highest sensitivity at meter terminals 11, 12), a series of suitably lower shunt resistances 42, 43, 44 are connected between a lead 53 connecting main input terminal 52 to meter terminal 12, with the other end of each successive shunt resistance 42, 43, 44 being provided with a succession of switch contacts 54, 55, 56. A movable switch arm 71 is connected to the other main input terminal 51 so that by moving switch arm 71 from the highest sensitivity contact 11 to successive lower-sensitivity shunt contacts 54, 55, 56, shunts 42, 43, 44 are successively connected in parallel to highest sensitivity shunt 20. To complete such lower sensitivity shunt circuit connection switch arm 71 is mechanically coupled to another switch arm 72 so that they both move in unison as indicated by a dash-line switch grip 63, while switch arm 72 connects the selected lower resistance shunt in parallel to the main highest sensitivity shunt 20. In order to measure current with lower sensitivities than that possible, with lowest resistance shunt 44, shunt 44 may be provided with a plurality of taps connected to a series of additional shunt switch contacts 57, 58, 59 for connecting successively lower resistance parts of the lowest shunt resistance 44 in parallel with the highest sensitivity shunt 20. Thus the two movable switch arms 71 and 72 are successively moved to the successive lower shunt contact positions 57, 58, 59 for selectively measuring current with a selected lower sensitivity.

FIG. 4-A shows how the meter transducing system of FIG. 4 may be modified into a static transducer circuit for transducing an electric input signal applied to one pair of complementary bridge input terminals of the circuit into a current proportional to the square of the applied input voltage which is delivered to an external circuit through the other conjugate pair of bridge output terminals. The transducer circuit of FIG. 4-A is analogous to the meter circuit of FIG. 4 in the same manner as the transducer circuit of FIG. 1-A is analogous to the meter circuit of FIG. 1 above. The transducer system of FIG. 4-A comprises a main bridge resistance 1-16 corresponding to the meter coil 16 of FIG. 4. A pair of complementary input terminals 51–5, 52–5 has connected between them the shunt resistance 34 (as 20 in FIG. 4). Input terminal 51–5 is connected through two complementary branch circuits 31–5, 33–5 each including, respectively, a set of oppositely poled similar asymmetric nonlinear junction diodes 25, to the two end terminals 35–5, 36–5 of main birdge resistance 1–16. The other bridge input terminal 52–5 is connected through two complementary branch circuits 32–5 and 34–5, each including respectively a set of oppositely poled similar asymmetric junction diodes 25, to the two output end terminals 35–5, 36–5 of the main bridge circuit. Thus the two pairs of branch circuits (31–5, 33–5) and (32–5, 34–5) with their respective sets of asymmetric junction diodes 25 operate analogous to the two sets of bridge circuits 31, 33 and 34, 32 with the impedance of the meter coil 16 of FIG. 4 (the resistance or impedance of which in itself will operate as a central birdge impedance of a transducer system similar to that described in FIG. 4 with the coil 16 held stationary, as is also the case with the meter of FIG. 1).

Figure 4A:
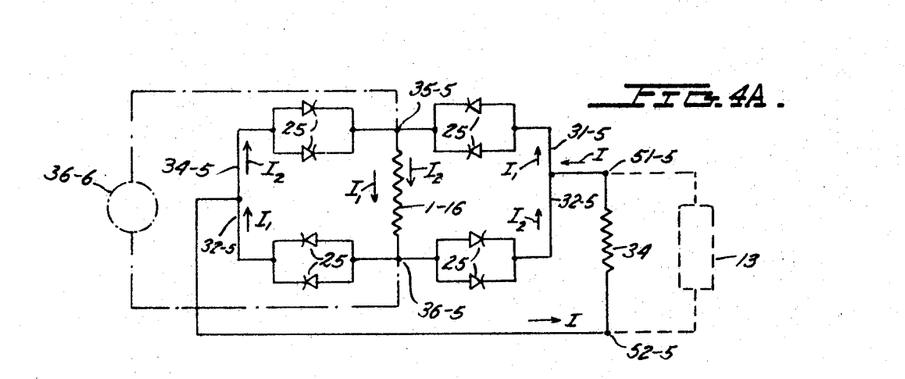

An input voltage applied by an external source 13 to bridge input terminals 51–5, 52–5 will produce in the main bridge resistance 1–16 a resultant current represented by T of FIG. 3 which is proportional to the square of the A.C. input voltage applied to the birdge terminal pair 51–5, 52–5. The pair of bridge output terminals 35–5, 36–5 forming the conjugate set of bridge output terminals through the bridge impedance, such as resistance 1–16, will deliver to an external load circuit shown in dash-lines 36–6 a signal current corresponding to the square of the A.C. input voltage applied to the pair of conjugate input terminals 51–5, 52–5. Any external properly proportioned impedance may be used as the main bridge impedance 1–16 of FIG. 4–A.

Figure 5:
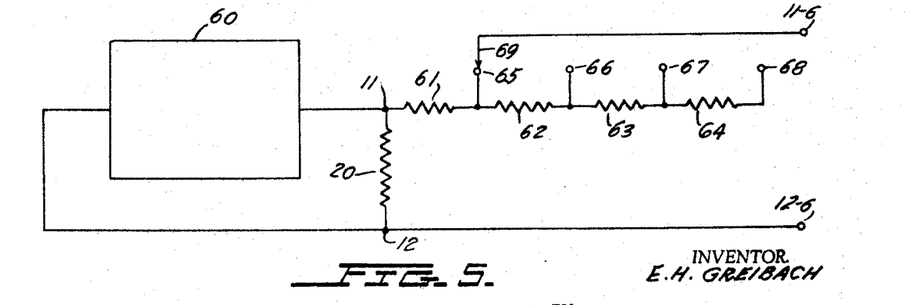
FIG. 5 is a circuit diagram of a voltmeter exemplifying the invention.

The current meter systems of the invention as such as described above in connection with FIGS. 1 and 4 may be also used for measuring the R.M.S. of the voltage of an A.C. circuit connected to the meter terminals. FIG. 5 shows how the meter system 60 of either FIG. 1 or FIG. 4 may be utilized as a part of a voltmeter by connecting to their meter input terminals, series multiplier resistances of the type used in measuring D.C. voltage with a conventional D.C. rotary coil meter movement of the D'Arsonval type. The R.M.S. current meter system 60 of FIG. 5 has a pair of input terminals 11, 12 across which is connected a shunt resistance 20 as described above in connection with FIGS. 1 and 4. To the meter input terminals 11, 12 is connected a voltage-measuring series multiplier circuit having two voltage input terminals 11–6, 12–6. Voltage input terminal 12–6 is connected to meter input terminal 12. To the other meter terminal 12–6 is connected a sequence of conventionally selected series multiplier resistances 61, 62, 63, 64 having a series of switch contacts 65, 66, 67, 68 arranged to be selectively connected by a movable selector switch contact 69 to the voltage measuring input terminal 11–6 for measuring the R.M.S. of an A.C. voltage of a circuit connected to voltage input terminals 11–6, 12–6. The series multiplier resistances 61–64 are of a conventional type used for measuring with a series of different sensitivities a D.C. voltage with a direct-current rotary coil meter movement.

Without thereby limiting the scope of the invention there are given below data for a specific meter embodiment of an R.M.S. A.C. current meter constructed in accordance with the invention. A direct-current meter of the type described in U.S. Patent No. 3,012,196 forming part of this meter system following that shown and described in connection with FIG. 4, with only two of the special semiconductor junction diodes connected in parallel in each of its four bridge arms 31, 32, 33, 34, measures the R.M.S. of A.C. current with a full scale deflection of 100 microamperes and about 50 millivolt voltage drop across the meter circuit with the high accuracy of ½ of 1% or better. Considerably higher meter sensitivity is obtained by connecting the two special semiconductor junction diodes of each of the four bridge arms in series. Such accurate R.M.S. measurements of A.C. current may be made with frequencies up to 1 million cycles per second, and higher frequencies by connecting across the meter terminals frequency-controlling compensating circuits consisting of combinations of resistances, capacities, and inductances.

Figure 6:
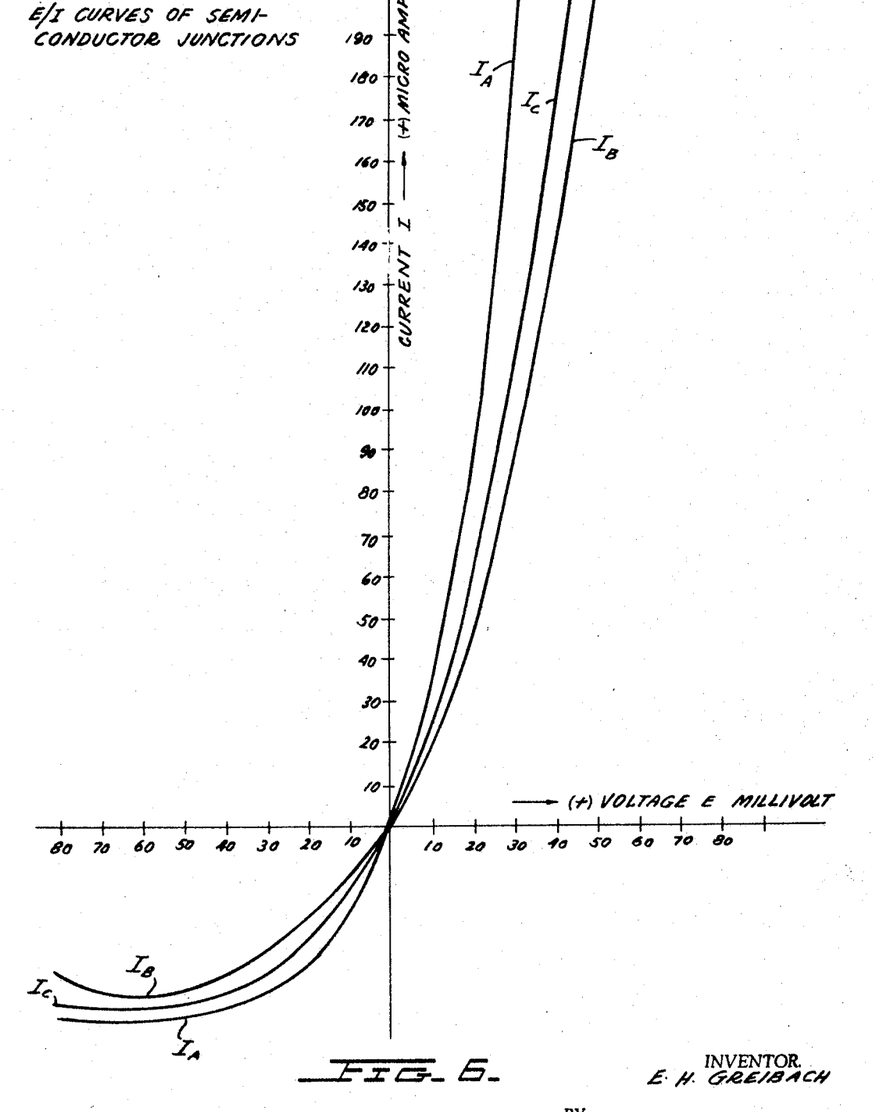
FIG. 6 shows characteristic curves of three semiconductor diodes as used in the invention circuitry.

With such meter and transducer systems of the invention, equalization of the current-voltage characteristics in each of the conjugate pairs of bridge arms, such as the bridge-arm pair 31, 32 and the other bridge-arm pair 33, 34 is achieved by combining therein the special asymmetric semiconductor junction diodes having respective current-voltage characteristics represented by curves $I_A$, $I_B$ and $I_C$ in FIG. 6. In FIG. 6 the applied voltage is given in millivolts, and the current is given in microamperes. Also the current and voltage scales on the negative sides are of identical magnitude as on their respective positive counterparts.

It should be noted that the meter systems based on the principles of the invention will measure with the same scale not only the R.M.S. value of A.C. currents but also D.C. currents. In fact the scale of meters of the invention may be drawn by passing through the meter circuit system D.C. currents corresponding to the different scale values.

I claim:

1. An electric measuring system comprising unidirectional magnetic field means and a bridge circuit system comprising a coil rotatable in the magnetic field produced by said magnetic field means for causing deflection of said coil, said bridge circuit system having two input terminals for having an input voltage applied thereacross, and two conjugate branch circuits each including a set of at least two asymmetric nonlinear semiconductor junction diodes connected with opposite polarity between one of said input terminals and the end coil turns of said coil respectively, the other of said input terminals being connected to said coil whereby an A.C. input voltage applied to said two input terminals causes predominantly opposite currents to pass through said two branch circuits and said coil to produce a resultant of the said opposite currents, each of said non-linear junction diodes having current-voltage characteristics wherein the current as a function of input voltage is a continuous characteristic current-volage curve passing through zero of the crossing coordinate system over a substantial continuous voltage range from below to above zero, said characteristic curve having a continuously variable derivative over said voltage range, and the forward and reverse currents of each of said diodes being substantially equal near zero applied voltage with the forward current being substantially larger than the reverse current beyond said near zero voltage, the current-voltage characteristics of said two sets of diodes and of said two branch circuits substantially balancing each other to produce substantially equal opposite bridge currents in each of said two branch circuits whereby said resultant current in said coil is proportional to the square of said applied A.C. input voltage and the effective torque and deflection of said coil corresponds to the root-mean-square of said applied A.C. input voltage.

2. In a measuring system as claimed in claim 1, further including a shunt resistance at most of the order of the direct-current resistance of the coil circuit being connected between said two input terminals for suppressing effects of the third power terms of the MacLaurin series expansion defining the current-voltage function of said diodes.

3. In a measuring system as claimed in claim 1, in which each of said sets of diodes are shunted by a symmetric nonlinear resistance.

4. In a measuring system as claimed in claim 2, in which each of said sets of diodes are shunted by a symmetric nonlinear resistance.

5. An electric measuring system comprising measuring means including unidirectional magnetic field means and a coil rotatable in the magnetic field thereof for causing deflection of said coil, and a bridge circuit having two conjugate branch circuits, each of said branch circuits having a serially connected arm pair comprising an impedance and at least one asymmetric non-linear junction diode poled oppositely to the corresponding diode in the other of said conjugate branch circuits, said impedance arms and said diode arms being serially connected into a closed four arm bridge circuit with the impedance arm of one branch circuit and the diode arm of the other branch circuit constituting opposite arms of said bridge circuit, said closed circuit having first and second input terminals at the junction of said pair of diode arms and at the junction of said pair of impedance arms respectively, with the opposite remote coil turns of said coil being respectively connected to one junction of one diode arm and one impedance arm and to the junction of the other diode arm and the other impedance arm of said closed circuit whereby an A.C. input voltage applied to said input terminals causes two predominantly oppositely poled currents to flow through said two conjugate branch circuits and produce a resultant of said two currents, each of said asymmetric junction diodes having current-voltage characteristics wherein the current as a function of input voltage is a continuous current-voltage curve passing through zero of the crossing coordinate system over a substantial continuous voltage range greater and smaller than zero, with said continuous curve also having a continuously variable derivative over said voltage range and the forward and reverse currents of each of said diodes being substantially equal near zero applied voltage and the forward current being substantially larger than the reverse current beyond said near zero voltage, the current-voltage characteristics of said diodes and their said respective branch circuits balancing each other to produce substantially opposed equal bridge currents in each of said two branch circuits and cause said resultant current in said coil to be proportional to the square of the A.C. voltage applied to said input terminals, whereby the effective torque and deflection of said coil corresponds to the root-mean-square of the applied A.C. voltage.

6. An electric measuring system as claimed in claim 5, in which each of said sets of diodes is shunted by a symmetric nonlinear junction for compensating the reduction of the reverse current through the respective diodes at increasing applied reverse voltage beyond the level at which the peak reverse current flows.

7. An alternating current circuit system for producing in an output impedance with two output terminals a current proportional to the square of an alternating-current voltage applied to two input terminals comprising circuit connections connecting said two input terminals to said output impedance and including a bridge circuit at least two arms of which each include rectifier means connected with opposite polarity between a common one of the input terminals and said two output terminals for passing predominantly opposite currents through said bridge arms and producing a resultant current through said output impedance under A.C. voltage applied to said input terminals, the rectifier means of each of said bridge arms including at least one nonlinear semiconductor junction diode having current-voltage characteristics represented by a continuous function curve passing through zero of the current-voltage coordinates over a substantial voltage range from above to below zero and defined by a MacLaurin expansion series, with said function curve having also continuously variable derivatives over said voltage range but with the higher than third power terms of the series being negligible with respect to the lower power terms, and the forward current of each junction diode being substantially larger than the reverse current above near zero voltage and being substantially equal thereto near zero voltage, the voltage-current characteristics of said junction diodes and of their bridge arms balancing each other in said bridge circuit to produce substantially equal currents in each of said bridge arms and cause said resultant current in said output impedance to be proportional to the square of the alternating-current voltage applied to said input terminals.

8. An alternating current circuit system as claimed in claim 7, wherein said bridge circuit comprises said output impedance and in which said circuit connections include a connection from the other of said input terminals to an intermediate portion of said output impedance.

9. An alternating current circuit system as claimed in claim 8, in which each of said bridge arms includes at least two of said junction diodes for equalizing the current-voltage characteristics of the respective bridge arms.

10. An alternating current circuit system as claimed in claim 7, in which said circuit connections comprise said two bridge arms connected between a common one of the input terminals and said two output terminals, and a further set of two bridge arms of the same characteristics connected between the other of said input terminals and said two output terminals, the voltage-current characteristics in each of said bridge arms connected between said two input terminals and said two output terminals being selected to balance each other and produce substantially equal currents in each of said bridge arms and cause said resultant current in said output impedance to be proportional to the square of the alternating-current voltage applied to said input terminals.

11. An alternating current circuit system as claimed in claim 10, wherein a shunt resistance at most of the order of the direct-current resistance of the circuit of the output impedance is connected between said two input terminals.

12. An alternating current circuit system as claimed in claim 10, wherein each set of junction diodes is shunted by a symmetric nonlinear resistance.

13. An alternating current circuit system as claimed in claim 10, wherein said output impedance is a coil of a direct-current measuring device rotatable in a magnetic field for indicating on a calibrated scale current flowing through said coil and thereby indicating the R.M.S. value of an alternating current input.

14. An alternating current circuit system as claimed in claim 7, in which each of said bridge arms includes at least two of said junction diodes for equalizing the current-voltage characteristics of the respective bridge arms.

15. An alternating current circuit system as claimed in claim 14, wherein a shunt resistance at most of the order of the direct-current resistance of the circuit of the output impedance is connected between said two input terminals.

16. An alternating current circuit system as claimed in claim 14, wherein each set of junction diodes is shunted by a symmetric nonlinear resistance.

17. An alternating current circuit system as claimed in claim 7, wherein a shunt resistance at most of the order of the direct-current resistnace of the circuit of the output impedance is connected between said two input terminals.

18. An alternating current circuit system as claimed in claim 17, wherein each set of junction diodes is shunted by a symmetric nonlinear resistance.

19. An alternating current circuit system as claimed in claim 17, wherein said output impedance is a coil of a direct-current measuring device rotatable in a magnetic field for indicating on a calibrated scale current flowing through said coil and thereby indicating the R.M.S. value of an alternating current input.

20. An alternating current circuit system as claimed in claim 7, wherein each set of junction diodes is shunted by a symmetric nonlinear resistance.

21. An alternating current circuit system as claimed in claim 20, wherein said output impedance is a coil of a direct-current measuring device rotatable in a magnetic field for indicating on a calibrated scale current flowing through said coil and thereby indicating the R.M.S. value of an alternating current input.

22. An alternating current circuit system as claimed in claim 7, wherein said output impedance is a coil of a direct-current measuring device rotatable in a magnetic field for indicating on a calibrated scale current flowing through said coil and thereby indicating the R.M.S. value of an alternating current input.

References Cited

UNITED STATES PATENTS

| | | | |
|---|---|---|---|
| 2,810,107 | 10/1957 | Sauber | 324—132 |
| 3,079,556 | 2/1963 | Connelly | 324—132 |
| 3,086,166 | 4/1963 | Salvatori | 323—79 |

FOREIGN PATENTS 337,907  11/1930  Great Britain.

OTHER REFERENCES

Crystal Diode "Circuit Kinks," pub. by Sylvania, 1952, pp. 1–12.

"21 Circuits for Sylvania Germanium Crystal Diodes," 1952, 8 pages.

"Germanium Crystal Diodes," pub. by Sylvania Electric, 1952, 4 pages.

RUDOLPH V. ROLINEC, Primary Examiner

ALFRED E. SMITH, Assistant Examiner

U.S. Cl. X.R.

307—229; 328—144